(12) United States Patent
Satake

(10) Patent No.: US 11,135,540 B2
(45) Date of Patent: Oct. 5, 2021

(54) DUST COLLECTING DEVICE AND SHEET MANUFACTURING APPARATUS

(71) Applicant: SEIKO EPSON CORPORATION, Tokyo (JP)

(72) Inventor: Akihiro Satake, Nagano (JP)

(73) Assignee: Seiko Epson Corporation, Tokyo (JP)

(*) Notice: Subject to any disclaimer, the term of this patent is extended or adjusted under 35 U.S.C. 154(b) by 258 days.

(21) Appl. No.: 16/464,340

(22) PCT Filed: Nov. 21, 2017

(86) PCT No.: PCT/JP2017/041812
§ 371 (c)(1),
(2) Date: May 28, 2019

(87) PCT Pub. No.: WO2018/101125
PCT Pub. Date: Jun. 7, 2018

(65) Prior Publication Data
US 2021/0113950 A1     Apr. 22, 2021

(30) Foreign Application Priority Data

Nov. 29, 2016   (JP) .............................. JP2016-231554

(51) Int. Cl.
*B01D 46/00*     (2006.01)
*B01D 46/24*     (2006.01)
*D21F 9/00*     (2006.01)

(52) U.S. Cl.
CPC ...... *B01D 46/0068* (2013.01); *B01D 46/2411* (2013.01); *D21F 9/00* (2013.01)

(58) Field of Classification Search
CPC ............ B01D 46/0067; B01D 46/0068; B01D 46/0069; B01D 46/0071; B01D 46/2411; D21F 9/00
See application file for complete search history.

(56) References Cited

U.S. PATENT DOCUMENTS

| | | |
|---|---|---|
| 3,884,657 A | 5/1975 | Rebours et al. |
| 2010/0132318 A1 | 6/2010 | Igawa |
| 2015/0182897 A1 | 7/2015 | Ji et al. |
| 2016/0258112 A1 | 9/2016 | Gomi et al. |

FOREIGN PATENT DOCUMENTS

| | | |
|---|---|---|
| CN | 202983425 U | 6/2013 |
| CN | 105937190 A | 9/2016 |
| JP | 47-008843 A | 5/1972 |
| JP | 62-114616 U | 7/1987 |
| JP | 04-150910 A | 5/1992 |
| JP | 05-184836 A | 7/1993 |
| JP | H07-178304 A | 7/1995 |

(Continued)

*Primary Examiner* — Robert Clemente
(74) *Attorney, Agent, or Firm* — Global IP Counselors, LLP

(57) ABSTRACT

A dust collecting device includes a cylindrical filter, a backwash auxiliary member that is disposed at an end portion of the filter and of which at least a part is disposed in a cylinder of the filter, and an air current generation unit that generates a backwash air current that passes through the backwash auxiliary member and flows into the cylinder of the filter, in which the backwash auxiliary member includes a rectification unit that extends spirally in an axial direction of a center axis of the filter.

6 Claims, 8 Drawing Sheets

(56) References Cited

FOREIGN PATENT DOCUMENTS

| | | |
|---|---:|---|
| JP | 3178547 U | 9/2012 |
| JP | 2014-012234 A | 1/2014 |
| JP | 2016-163944 A | 9/2016 |
| KR | 10-2012-0119640 A | 10/2012 |
| WO | 2008/004319 A1 | 1/2008 |

DUST COLLECTING DEVICE AND SHEET MANUFACTURING APPARATUS

CROSS-REFERENCE TO RELATED APPLICATIONS

This application is a U.S. National stage application of International Patent Application No. PCT/JP2017/041812, filed on Nov. 21, 2017, which claims priority under 35 U.S.C. § 119(a) to Japanese Patent Application No. 2016-231554, filed in Japan on Nov. 29, 2016. The entire disclosure of Japanese Patent Application No. 2016-231554 is hereby incorporated herein by reference.

TECHNICAL FIELD

The present invention relates to a dust collecting device and a sheet manufacturing apparatus.

BACKGROUND ART

In related art, in a dust collecting device, a backwash auxiliary member (jig) that rectifies compressed air to be backwash air current is provided in a cylinder of a cylindrical filter (for example, refer to International Publication No. 2008/004319). In International Publication No. 2008/004319, the backwash auxiliary member includes a conical upper end contraction unit that shrinks in diameter and tapers toward an upstream end at an end portion on an upstream in the flow of the backwash air current. According to International Publication No. 2008/004319, since the backwash air current hitting the upper end contraction unit is dispersed in the radial direction, it is possible to suppress generation of negative pressure even in a place where the flow speed of the backwash air current tends to be high and it is possible to perform backwashing even at an upstream end portion of a filter.

By the way, in a dust collecting device and a sheet manufacturing apparatus that includes a dust collecting device, it is desired that an entire cylindrical filter can be backwashed approximately uniformly.

SUMMARY

In view of the circumstances described above, an object of the present invention is to enable almost uniform backwashing of an entire cylindrical filter.

In order to achieve the above object, a dust collecting device of the present invention includes a cylindrical filter, a backwash auxiliary member that is disposed at an end portion of the filter and of which at least a part is disposed in a cylinder of the filter, and an air current generation unit that generates a backwash air current that passes through the backwash auxiliary member, and flows into the cylinder of the filter, in which the backwash auxiliary member includes a rectification unit that extends spirally in the axial direction of the center axis of the filter.

According to the present invention, the backwash air current flows along the spiral rectification unit included in the backwash auxiliary member in a direction that intersects with a center axis of a filter away from the center axis and in an axial direction of the filter while rotating around the filter. Therefore, while it is possible to prevent generation of negative pressure at an end portion of the filter where the backwash auxiliary member is disposed, it is possible to supply almost uniform backwash air current to the almost entire filter in the axial direction and it is possible to backwash the entire filter almost uniformly.

Further, in the present invention, the backwash auxiliary member includes a center unit that extends along the center axis of the filter, and the rectification unit is formed in a blade shape that extends spirally in the axial direction of the center axis along the center unit while extending outward from the center unit.

According to the present invention, since the backwash air current flows along the blade-shaped rectification unit that extends spirally in the axial direction of the center axis of the filter in the cylinder in a direction that intersects with the center axis of the filter away from the center axis and in the axial direction of the filter while rotating around the filter, it is possible to backwash the entire filter approximately uniformly. Further, it is possible to form a backwash auxiliary member in a simple shape that extends the blade-shaped rectification unit from the center unit with high efficiency in backwashing.

Further, in the present invention, a plurality of the rectification units are provided at intervals from each other in the circumferential direction of the center unit.

According to the present invention, the backwash air current can flow among a plurality of blade-shaped rectification units in the axial direction of the filter. Therefore, it is possible to prevent the rectification unit from becoming a large resistance against the backwash air current and it is possible to backwash the entire filter almost uniformly.

Further, in the present invention, the air current generation unit includes a nozzle that ejects the compressed air to be the backwash air current toward the backwash auxiliary member, and the backwash auxiliary member is held by a holding member that extends from a supporting wall supporting the nozzle in the ejection direction of the compressed air into the cylinder of the filter.

According to the present invention, since it is possible to suppress hindrance of the backwash air current by the holding member that holds the backwash auxiliary member, it is possible to backwash the entire filter approximately uniformly.

Further, the dust collecting device of the present invention includes a cylindrical filter, a backwash auxiliary member that is disposed at an end portion of the filter and of which at least a part is disposed in a cylinder of the filter, and an air current generation unit that generates the backwash air current that passes through the backwash auxiliary member and flows into the cylinder of the filter, and the backwash auxiliary member rectifies the air current from the air current generation unit in the cylinder and turns into a swirling current that swirls around the center axis of the filter.

According to the present invention, the backwash air current is rectified by the backwash auxiliary member to be a swirling current and intersects with the center axis of the filter to flow in a direction away from the center axis and in an axial direction of the filter while rotating around the center axis of the filter. Therefore, it is possible to supply the backwash air current to the approximately entire filter in the axial direction approximately uniformly while it is possible to prevent generation of negative pressure at an end portion (tip end) of the filter where the backwash auxiliary member is disposed, and it is possible to backwash the entire filter approximately uniformly.

Further, the sheet manufacturing apparatus of the present invention includes a sheet formation unit that forms a sheet from raw material including a fiber and a dust collecting device that recovers removal target material out of the raw material which, without being used in manufacturing of the sheet, is recovered, the dust collecting device includes a cylindrical filter, a backwash auxiliary member that is disposed at an end portion of the filter and of which at least a part is disposed in a cylinder of the filter, and an air current generation unit that generates backwash air current that passes through the backwash auxiliary member and flows into the cylinder of the filter, and the backwash auxiliary member includes a rectification unit that extends spirally in the axial direction of the center axis of the filter.

According to the present invention, since the dust collecting device of the sheet manufacturing apparatus includes in the cylinder a backwash auxiliary member that includes a rectification unit extending spirally, it is possible to backwash the entire filter approximately uniformly.

DESCRIPTION OF EMBODIMENTS

Hereinafter, preferred embodiments of the present invention will be described in detail with reference to the drawings. It should be noted that the embodiments described below do not limit the contents of the present invention described in the claims. Further, all the configurations described below are not indispensable configuration requirements.

Figure 1:
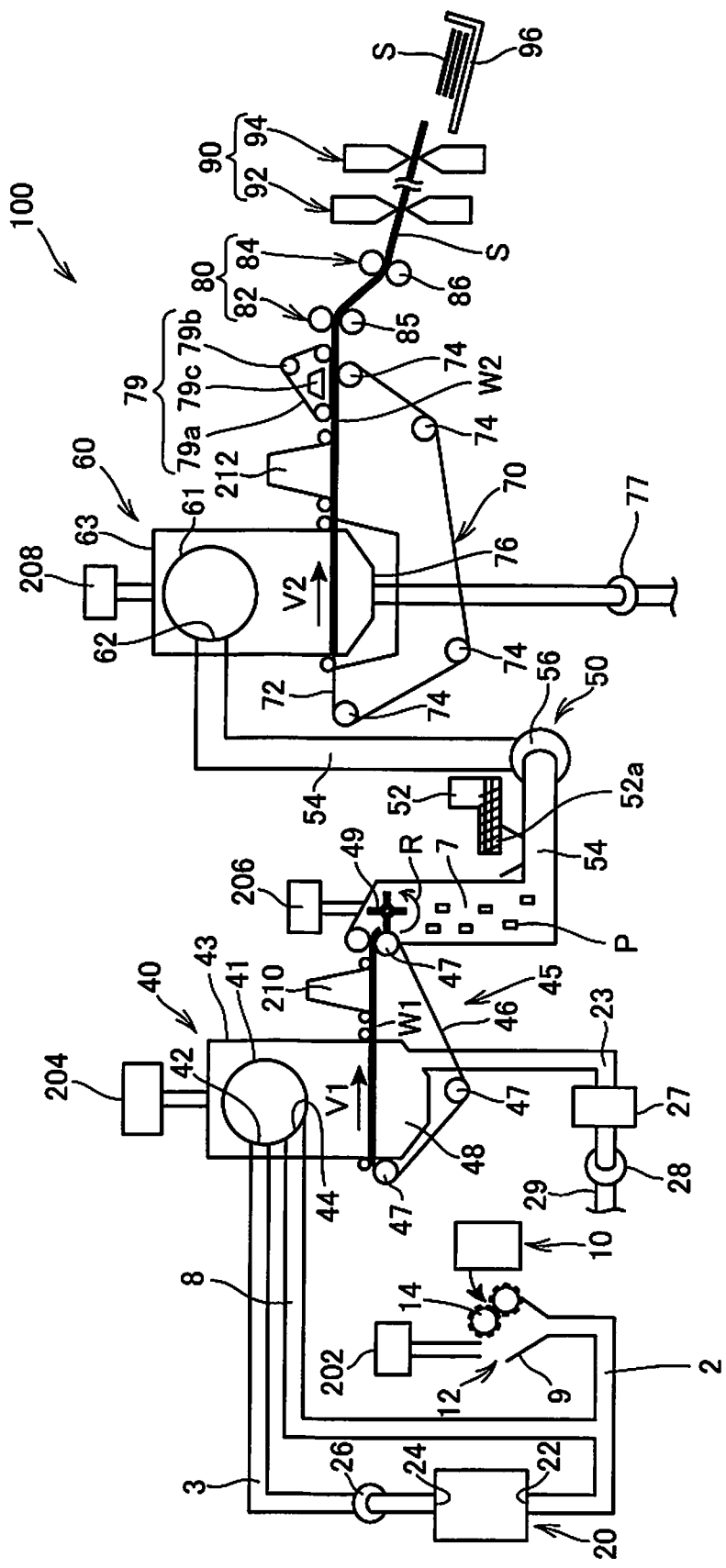
FIG. 1 is a schematic diagram showing a configuration of a sheet manufacturing apparatus according to an embodiment of the present invention.

FIG. 1 is a schematic diagram showing a configuration of a sheet manufacturing apparatus 100 according to an embodiment.

The sheet manufacturing apparatus 100 described in the present embodiment is an apparatus suitable for manufacturing new paper sheet by defibrillating in a dry manner and then pressing, heating, and cutting waste paper such as confidential paper or the like as a raw material.

By mixing various additives to fibrillated raw material, it is possible to improve bonding strength and whiteness of paper products and add color, scent and a function such as fire retardance or the like of paper products in accordance with use. Further, by controlling density, thickness and shape of the paper, it is possible to manufacture paper sheets of various thickness and sizes in accordance with the use such as office paper of A4 or A3, business card paper, and the like.

The sheet manufacturing apparatus 100 includes a supply unit 10, coarsely crushing unit 12, a defibrillation unit 20, a sorting unit 40, a first web formation unit 45, a rotating object 49, a mixing unit 50, an accumulation unit 60, a second web formation unit 70, a transport unit 79, a sheet formation unit 80, and a cutting unit 90.

Further, the sheet manufacturing apparatus 100 includes humidification units 202, 204, 206, 208, 210, and 212 for the purpose of humidifying the raw material and/or the space through which the raw material moves. The specific configuration of the humidification units 202, 204, 206, 208, 210, and 212 is optional, and examples are a steam type, a vaporization type, a warm air vaporization type, an ultrasonic type, and the like.

In the present embodiment, the humidification units 202, 204, 206, and 208 are configured with a vaporization type or warm air vaporization type humidifiers. That is, the humidification units 202, 204, 206, and 208 include filters (not shown) that moisten with water, and humidified air with increased humidity is supplied as the air passes through the filters. Further, the humidification units 202, 204, 206, and 208 can include heaters (not shown) that effectively raise the humidity of the humidified air.

Further, in the present embodiment, the humidification units 210 and 212 are configured with ultrasonic humidifiers. That is, the humidification units 210 and 212 include vibration units (not shown) that atomize water and supply mist generated by the vibration units.

The supply unit 10 supplies raw material to the coarsely crushing unit 12. The raw material from which the sheet manufacturing apparatus 100 manufactures the sheets may include fibers, and examples thereof are paper, pulp, pulp sheet, cloth including non-woven fabric, fabric and the like. In the present embodiment, a configuration in which the sheet manufacturing apparatus 100 uses waste paper as a raw material is illustrated as an example. The supply unit 10 can be configured to include, for example, a stacker that accumulates used paper one over the other and an automatic feeding device that feeds the used paper from the stacker to the coarsely crushing unit 12.

The coarsely crushing unit 12 cuts (coarsely crushes) the raw material supplied by the supply unit 10 by a coarsely crushing blade 14 into coarsely crushed pieces. The coarsely crushing blade 14 cuts the raw material in the atmosphere (in the air). The coarsely crushing unit 12 includes, for example, a pair of coarsely crushing blade 14 that cuts the raw material while pinching the raw material therebetween and a driving unit that rotates the coarsely crushing blade 14 and can be configured similarly to a shredder. A coarsely crushed piece may be of any shape and size, as long as it is suitable for defibrillation processing by the defibrillation unit 20. For example, the coarsely crushing unit 12 cuts the raw material into paper shreds having a size of one to several centimeters or less on each of the four sides.

The coarsely crushing unit 12 includes a chute (hopper) 9 that receives coarsely crushed pieces cut by the coarsely crushing blade 14 and falling. The chute 9 has, for example, a tapering shape with the width gradually narrowing in a direction (advancing direction) in which the coarsely crushed pieces flow. Therefore, the chute 9 can receive many coarsely crushed pieces. A tube 2 communicating with the defibrillation unit 20 is connected to the chute 9, and the tube 2 forms a transport path for transporting the raw material (coarsely crushed pieces) cut by the coarsely crushing blade 14 to the defibrillation unit 20. The coarsely crushed pieces are collected by the chute 9 and fed (transported) to the defibrillation unit 20 through the tube 2.

Humidified air is supplied to the chute 9, or to the vicinity of the chute 9 included in the coarsely crushing unit 12 by the humidification unit 202. In this way, it is possible to suppress the phenomenon that the coarsely crushed material obtained by cutting by the coarsely crushing blade 14 is adsorbed to the inner surface of the chute 9 or the tube 2 by the static electricity. Further, since the coarsely crushed material obtained by the cutting by the coarsely crushing blade 14 is fed to the defibrillation unit 20 together with the (highly humid) humidified air, the effect of suppressing adsorption of defibrillation material in the defibrillation unit 20 can also be anticipated. Further, the humidification unit 202 can be configured to supply the humidified air to the coarsely crushing blade 14 and destaticize the raw material supplied from the supply unit 10. Further Also, an ionizer can be used together with the humidification unit 202 to destaticize.

Defibrillation unit 20 defibrillates coarsely crushed material obtained by the cutting by the coarsely crushing unit 12. More specifically, the defibrillation unit 20 defibrillates the raw material (coarsely crushed pieces) obtained by cutting by the coarsely crushing unit 12 to generate defibrillated material. Here, "to defibrillate" means to unravel raw material (material to be defibrillated), formed by the binding of a plurality of fibers, one by one. The defibrillation unit 20 also has a function of separating substances such as resin particles adsorbed to the raw material, ink, toner, bleeding prevention agent, and the like from the fiber.

What has passed through the defibrillation unit 20 is referred to as "defibrillated material". In the defibrillated material, in addition to the unraveled defibrillated fibers, resin (resin for binding a plurality of fibers) particles separated from fibers at the time of defibrillation, coloring agents such as ink, toner, or the like, and additives such as bleeding prevention agent, paper strengthening agent, or the like are included in some cases. The shape of unraveled defibrillated material is a string shape or a ribbon shape. The unraveled defibrillated material may exist in a state (independent state) of not being entangled with another unraveled fiber or may exist in a lumpy state (state of forming a so-called "lump") of being entangled with another unraveled fiber.

Defibrillation unit 20 performs defibrillation in a dry manner. Here, performing treatment such as defibrillation or the like in the atmosphere (in the air), not in a liquid, is referred to as a dry type. In the present embodiment, the defibrillation unit 20 is configured to use an impeller mill. Specifically, the defibrillation unit 20 includes a rotor (not shown) rotating at a high speed and liner (not shown) positioned on the outer periphery of the rotor. The coarsely crushed pieces obtained by the cutting of the coarsely crushing unit 12 are defibrillated interposed between the rotor and the liner of the defibrillation unit 20. The defibrillation unit 20 generates an air current by the rotation of the rotor. By this air current, the defibrillation unit 20 can suck the coarsely crushed pieces as a raw material through the tube 2 and transport the defibrillated material to a discharge port 24. The defibrillated material is sent out from the discharge port 24 to a tube 3 and fed to a sorting unit 40 through the tube 3.

In this way, the defibrillated material generated by the defibrillation unit 20 is transported from the defibrillation unit 20 to the sorting unit 40 by the air current generated by the defibrillation unit 20. Further, in the present embodiment, the sheet manufacturing apparatus 100 includes a defibrillation unit blower 26 which is an air current generation device, and the defibrillated material is transported to the sorting unit 40 by the air current generated by the defibrillation unit blower 26. The defibrillation unit blower 26 is attached to the tube 3 and sucks, the air together with the defibrillated material from the defibrillation unit 20 to blow to the sorting unit 40.

The sorting unit 40 includes an inlet port 42 through which the defibrillated material defibrillated by the defibrillation unit 20 flows from the tube 3 together with the air current. The sorting unit 40 sorts out the defibrillated material to be introduced to the inlet port 42 by the length of the fiber. Specifically, the sorting unit 40 selects, out of the defibrillated material defibrillated by the defibrillation unit 20, the defibrillated material having a size equal to or less than a predetermined size as a first sorted material and the defibrillated material bigger than the first sorted material as a second sorted material. The first sorted material includes fibers, particles, or the like, and the second sorted material includes, for example, big fibers, undefibrillated pieces (coarsely crushed pieces not sufficiently defibrillated into), lump into which the defibrillated fibers are lumped together or entangled into, or the like.

In the present embodiment, the sorting unit 40 includes a drum unit (sieve unit) 41 and a housing unit (cover unit) 43 that houses the drum unit 41. The drum unit 41 is a cylindrical sieve rotationally driven by a motor. The drum unit 41 has a mesh (filter, screen) and functions as a sieve. By the eyes of the mesh, the drum unit 41 sorts out the first sorted sheet manufacturing apparatus is smaller than the size of the eye opening (opening) of the mesh and the second sorted material bigger than the eye opening of the mesh. As a mesh of the drum unit 41, for example, a wire mesh, an expanded metal into which a cut metal plate is stretched, a punching metal which is a metal plate having a hole formed by a press machine or the like can be used.

The defibrillated material introduced to the inlet port 42 is fed to the inside of the drum unit 41 together with the air current, and the first sorted material falls downward from the mesh of the drum unit 41 by the rotation of the drum unit 41. The second sorted material that fails to pass the mesh of the drum unit 41 flows by the air current flowing from the inlet port 42 into the drum unit 41 and is introduced to the discharge port 44 to be sent out to a tube 8.

The tube 8 connects the inside of the drum unit 41 with the tube 2. The second sorted material flowing through the tube 8 flows through the tube 2 together with the coarsely crushed pieces obtained by the cutting by the coarsely crushing unit 12 and introduced to the inlet port 22 of the defibrillation unit 20. In this way, the second sorted material is returned to the defibrillation unit 20 and is defibrillated.

Further, the first sorted material sorted by the drum unit 41 is dispersed into the air through the eyes of the mesh of the drum unit 41 and falls toward a mesh belt 46 of a first web formation unit 45 positioned below the drum unit 41.

The first web formation unit 45 (separation unit) includes the mesh belt 46 (separation belt), a stretching roller 47, and a suction unit (suction mechanism) 48. The mesh belt 46 is a continuous track-shaped belt, is suspended by three stretching rollers 47, and, by the movement of the stretching roller 47, is transported in the direction indicated by an arrow in the figure. The surface of the mesh belt 46 is configured with a mesh in which openings of a predetermined size are arranged in a row. Out of the first sorted material falling from the sorting unit 40, the fine particles of a size that passes through the mesh eyes fall below the mesh belt 46 and the fibers of a size that cannot pass through the mesh eyes are accumulated on the mesh belt 46 and transported in the arrow direction together with the mesh belt 46. The fine particles falling from the mesh belt 46 include relatively small ones or ones of low density (resin particles, coloring agents, additives, or the like) among the defibrillated material, and are removal target materials that are not used in the sheet manufacturing apparatus 100 in the manufacturing of the sheet S.

The mesh belt 46 moves at a constant speed V1 during the normal operation in manufacturing the sheet S. Here, the "during normal operation" refers to "during the operation" excluding "during the execution" of the start control and the stop control of the sheet manufacturing apparatus 100 to be described below, and more specifically refers to "while the sheet manufacturing apparatus 100 is manufacturing the sheet S of the desired quality".

Therefore, the defibrillated material defibrillated by the defibrillation unit 20 is sorted into the first sorted material and the second sorted material by the sorting unit 40, and the second sorted material is returned to the defibrillation unit 20. Further, from the first sorted material, the removal target material is removed by the first web formation unit 45. The remainder of the first sorted material from which the removal target material is removed is a material suitable for manufacturing the sheet S, and the material is accumulated on the mesh belt 46 and forms a first web W1.

The suction unit 48 sucks the air from below the mesh belt 46. The suction unit 48 is connected to the dust collecting unit 27 (dust collecting device) through a tube 23. The dust collecting unit 27 separates the fine particles from the air current. A collection blower 28 is disposed below the dust collecting unit 27, the collection blower 28 functions as a dust collecting suction unit that sucks the air from the dust collecting unit 27. Further, the air discharged by the collection blower 28 passes through a tube 29 to be discharged to the outside of sheet manufacturing apparatus 100.

In this configuration, air is sucked from the suction unit 48 through the dust collecting unit 27 by the collection blower 28. In the suction unit 48, the fine particles passing through the mesh eyes of the mesh belt 46 are sucked with the air and fed to the dust collecting unit 27 through the tube 23. The dust collecting unit 27 separates from the air current and accumulates the fine particles that have passed through the mesh belt 46.

Therefore, on the mesh belt 46, the fibers of the first sorted material from which the removal target material is removed are accumulated and the first web W1 is formed. As the collection blower 28 performs suction, the formation of the first web W1 on the mesh belt 46 is promoted and the removal target material is quickly removed.

Humidified air is supplied to the space that includes the drum unit 41 by the humidification unit 204. By the humidified air, the first sorted material in the sorting unit 40 is humidified. In this way, it is possible to weaken the adsorption of the first sorted material to the mesh belt 46 due to the electrostatic force and to easily peel the first sorted material from the mesh belt 46. Further, it is possible to suppress the adsorption of the first sorted material to the inner walls of the rotating object 49 and the housing unit 43 due to the electrostatic force. Further, it is possible to suck the removal target material by the suction unit 48 efficiently.

It should be noted that, in the sheet manufacturing apparatus 100, the configuration of sorting and separating the first defibrillated material and the second defibrillated material is not limited to the sorting unit 40 that includes the drum unit 41. For example, a configuration may be adopted in which the defibrillated material defibrillated by the defibrillation unit 20 is classified by a classifier. As a classifier, a cyclone classifier, an elbow jet classifier, or an eddy classifier can be used. By using these classifiers, it is possible to sort and separate the first sorted material and the second sorted material. Further, with the above classifier, it is possible to realize a configuration of separating and removing the removal target material that includes, among the defibrillated materials, relatively small ones or ones of low density (resin particles, coloring agents, additives, or the like). For example, the fine particles included in the first sorted material may be removed from the first sorted material by a classifier. In this case, a configuration of returning the second sorted material to the defibrillation unit 20, collecting the removal target material by the dust collecting unit 27, and feeding the first sorted material from which the removal target material is removed to the tube 54 is possible.

In the transport path of the mesh belt 46, the air including mist is supplied to the downstream of the sorting unit 40 by the humidification unit 210. The mist which is fine particles of water generated by the humidification unit 210 falls toward the first web W1 and supplies moisture to the first web W1. In this way, it is possible to adjust the moisture volume included in the first web W1 and to suppress the adsorption of the fibers to the mesh belt 46 due to the electrostatic force.

The sheet manufacturing apparatus 100 includes the rotating object 49 that divides the first web W1 accumulated on the mesh belt 46. The first web W1 is peeled from the mesh belt 46 at a position where the mesh belt 46 is folded back by the stretching roller 47 and divided by the rotating object 49.

The first web W1 is a soft material in which fibers are accumulated to form a web shape, and the rotating object 49 unravels and processes the fibers of the first web W1 into a state in which resin can be easily mixed by the mixing unit 50 to be described below.

The rotating object 49 can be of any configuration, but in the present embodiment, the rotating object 49 can be of a rotation feather shape that has plate-shaped blades and rotates. The rotating object 49 is disposed at a position where the first web W1 peeled from the mesh belt 46 comes into contact with the blades. By the rotation (rotation in the direction indicated by the arrow R in the drawing) of the rotating object 49, the blades collide with and divide the first web W1 peeled and transported from the mesh belt 46 and generate fragments P.

It is preferable that the rotating object 49 be installed at a position where the blades of the rotating object 49 do not collide with the mesh belt 46. For example, the interval between the tip end of the blade of the rotating object 49 and the mesh belt 46 can be equal to or longer than 0.05 mm and equal to or shorter than 0.5 mm, and in this case, it is possible to divide the first web W1 by the rotating object 49 without inflicting damage to the mesh belt 46.

Fragments P divided by the rotating object 49 falls in the tube 7 and is fed (transported) to the mixing unit 50 by the air current flowing in the tube 7.

Further, humidified air is supplied to the space including the rotating object 49 by the humidification unit 206. In this way, it is possible to suppress the phenomenon that fibers are adsorbed to the inside of tube 7 and the blade of the rotating object 49 due to the static electricity. Further, since highly humid air is supplied to the mixing unit 50 through the tube 7, it is possible to suppress the effect of the static electricity in the mixing unit 50.

The mixing unit 50 includes an additive supply unit 52 (resin supply unit) that supplies additives including a resin, a tube 54 that communicates with the tube 7 and through which the air current including the fragments P flows, and a mixing blower 56. The fragment P is a fiber obtained by the removal of the removal target material from the first sorted material that has passed through the sorting unit 40 as described above. The mixing unit 50 mixes additives including a resin into the fibers that constitute the fragment P.

Air current is generated by the mixing blower 56 in the mixing unit 50, and the fragments P and additives are mixed while being transported in the tube 54. Further, the fragments P are loosened in the course of flowing through the tubes 7 and 54 and turn into finer fibrous shapes.

The additive supply unit 52 (resin accommodation unit) is connected to an additive cartridge (not shown) that accumulates additives and supplies additives in the additive cartridge to the tube 54. The additive cartridge may be configured to be attachable to and detachable from the additive supply unit 52. Further, the additive cartridge may be configured to be refillable with the additive. The additive supply unit 52 temporarily stores additives made of fine powder or fine particles in the additive cartridge. The additive supply unit 52 includes a discharge unit 52a (resin supply unit) that feeds the temporarily stored additive to the tube 54.

The discharge unit 52a includes a feeder (not shown) that feeds the additive temporarily stored in the additive supply unit 52 to the tube 54 and a shutter (not shown) that opens and closes the tube line that connects the feeder with the tube 54. When the shutter is closed, the tube line or the opening that connects the discharge unit 52a with the tube 54 is shut and the supply of additives from the additive supply unit 52 to the tube 54 is cut off.

In a state where the feeder of the discharge unit 52a is not in operation, no additive is supplied from the discharge unit 52a to the tube 54, but when a negative pressure is generated in the tube 54, there is a possibility that the additives flow to the tube 54 even if the feeder of the discharge unit 52a has stopped. By closing the discharge unit 52a, it is possible to reliably cut off such flow of the additives.

The additive supplied by the additive supply unit 52 includes a resin for binding a plurality of fibers. The resin included in the additive is a thermoplastic resin or a thermosetting resin, and the example thereof includes AS resin, ABS resin, polypropylene, polyethylene, polyvinyl, polystyrene, acrylic resin, polyester resin, polyethylene terephthalate, polyphenylene ether, polybutylene terephthalate, nylon, polyamide, polycarbonate, polyacetal, polyphenylene sulfide, polyether ether ketone, and the like. These resins may be used alone or in a suitable mixture. That is, the additive may include a single substance, may be a mixture, or may include various types of particles each of which is composed of a single substance or a plurality of substances. Further, the additive may be in a fibrous form or in a powder form.

The resin included in the additive melts by heating and binds a plurality of fibers together. Therefore, in a state where a resin is mixed with fibers, the fibers are not bound to each other in a state where the resin is not heated up to the temperature at which the resin melts.

Further, the additive supplied by the additive supply unit 52 may include a coloring agent for coloring the fibers, a lumping suppressant that suppresses lumping of fibers or lumping of resins, and a fire retardant that makes fibers or the like less susceptible to burning in addition to the resin that binds the fibers in accordance with the type of sheets to be manufactured. Further, the additive that does not include a coloring agent may be colorless or of color thin enough to be considered colorless or may be white.

By the air current generated by the mixing blower 56, the fragments P that fall down the tube 7 and the additive supplied by the additive supply unit 52 are sucked in the tube 54 and pass through the inside of the mixing blower 56. By the action of the air current generated by the mixing blower 56 and/or the rotation unit such as the blades of the mixing blower 56, the fibers that constitute the fragments P and the additives are mixed, and this mixture (mixture of the first sorted material and the additive) is transferred to the accumulation unit 60 through the tube 54.

A mechanism for mixing the first sorted material and the additive is not particularly limited, and may be one that agitates by a blade rotating at a high speed, or may be one that utilizes the rotation of a container like a V-type mixer, or may be installed before or after the mixing blower 56.

The accumulation unit 60 accumulates the defibrillated material defibrillated by the defibrillation unit 20. More to the point, the accumulation unit 60 introduces the mixture passing through the mixing unit 50 from the inlet port 62, unravels the lumped defibrillated material (fiber), and drops while dispersing in the air. Further, when the resin of the additive supplied from the additive supply unit 52 is fibrous, the accumulation unit 60 unravels the lumped resin. In this way, the accumulation unit 60 can accumulate the mixture in the second web formation unit 70 uniformly.

The accumulation unit 60 includes a drum unit 61 and a housing unit (cover unit) 63 that houses the drum unit 61. The drum unit 61 is a cylindrical sieve rotationally driven by a motor. The drum unit 61 includes a mesh (filter, screen) and functions as a sieve. By the eyes of the mesh, the drum unit 61 passes the fiber and particles smaller than the mesh eye opening (opening) of the mesh and drops the passed fiber and particles from the drum unit 61. The configuration of the drum unit 61 is, for example, the same as that of the drum unit 41.

The "sieve" of the drum unit 61 may not have a function of sorting out a specific object. That is, the "sieve" used as the drum unit 61 means the one provided with a mesh, and the drum unit 61 may drop all of the mixture introduced into the drum unit 61.

The second web formation unit 70 is disposed below the drum unit 61. The second web formation unit 70 accumulates the passing material that has passed through the accumulation unit 60 and forms the second web W2. The second web formation unit 70 includes, for example, a mesh belt 72, a roller 74, and a suction mechanism 76.

The mesh belt 72 is a continuous track-shaped belt, is suspended by a plurality of rollers 74, and, by the movement of the roller 74, is transported in the direction indicated by an arrow in the figure. The mesh belt 72 is, for example, a metal, a resin, a cloth, a nonwoven fabric, or the like. The surface of the mesh belt 72 is configured with a mesh in which openings of a predetermined size are arranged in a row. Out of the fibers and particles dropping from the drum unit 61, the fine particles of a size passing through the eyes of the mesh drop below the mesh belt 72, and the fibers of a size that cannot pass through the eyes of the mesh are accumulated on the mesh belt 72 and transported in the arrow direction together with the mesh belt 72. The mesh belt 72 moves at a constant speed V2 during the operation of manufacturing the sheet S.

The eyes of the mesh of the mesh belt 72 are fine and can be of a size that does not allow most of the fibers and particles dropping from the drum unit 61 to pass through.

The suction mechanism 76 is provided below the mesh belt 72 (on the opposite to the accumulation unit 60 side). The suction mechanism 76 includes a suction blower 77 and can generate air current (air current from the accumulation unit 60 toward the mesh belt 72) directed toward below the suction mechanism 76 by the suction force of the suction blower 77.

By the suction mechanism 76, the mixture dispersed in the air by the accumulation unit 60 is sucked onto the mesh belt 72. In this way, the formation of the second web W2 on the mesh belt 72 can be promoted and the discharge speed from the accumulation unit 60 can be increased. Further, by the suction mechanism 76, a down flow can be formed in the falling path of the mixture, and it is possible to prevent lumping of the defibrillated material and additives during the falling.

The suction blower 77 (accumulation suction unit) may discharge the air sucked from the suction mechanism 76 to the outside of the sheet manufacturing apparatus 100 through a collection filter (not shown). The air sucked by the suction blower 77 may be fed to the dust collecting unit 27 and the removal target material included in the air sucked by the suction mechanism 76 can be collected.

Humidified air humidified by the humidification unit 208 is supplied to the space that includes the drum unit 61. By this humidified air, the inside of the accumulation unit 60 can be humidified, the adsorption of fibers and particles to the housing unit 63 due to the electrostatic force can be suppressed, the fibers and particles can be dropped to the mesh belt 72 fast, and the second web W2 in a preferable shape can be formed.

As described above, through the accumulation unit 60 and the second web formation unit 70 (web formation step), the second web W2 that includes a large volume of air to be in a soft and bulging state is formed. The second web W2 accumulated on the mesh belt 72 is transported to the sheet formation unit 80.

In the transport path of the mesh belt 72, the air including mist is supplied by the humidification unit 212 on the downstream of the accumulation unit 60. In this way, the mist generated by the humidification unit 212 is supplied to the second web W2 and the moisture volume included in the second web W2 is adjusted. In this way, it is possible to suppress the adsorption of the fibers to the mesh belt 72 by the static electricity.

The sheet manufacturing apparatus 100 is provided with the transport unit 79 that transports the second web W2 on the mesh belt 72 to the sheet formation unit 80. The transport unit 79 includes, for example, a mesh belt 79a, a roller 79b, and a suction mechanism 79c.

The suction mechanism 79c includes a blower (not shown) and generates an upward air current to the mesh belt 79a by the suction force of the blower. The air current sucks the second web W2 and the second web W2 is adsorbed to the mesh belt 79a away from the mesh belt 72. The mesh belt 79a moves by the rotation of the roller 79b and transports the second web W2 to the sheet formation unit 80. The moving speed of the mesh belt 72 and the moving speed of the mesh belt 79a are the same, for example.

In this way, the transport unit 79 peels from the mesh belt 72, and transports, the second web W2 formed on the mesh belt 72.

The sheet formation unit 80 forms the sheet S from the accumulation accumulated in the accumulation unit 60. More specifically, the sheet formation unit 80 presses and heats the second web W2 (accumulation) accumulated on the mesh belt 72 and transported by the transport unit 79 and forms the sheet S. In the sheet formation unit 80, heat is applied to the fibers of defibrillated material and the additive included in the second web W2 such that a plurality of fibers in the mixture are bound with each other through the additive (resin).

The sheet formation unit 80 includes a pressing unit 82 that presses the second web W2 and a heating unit 84 that heats the second web W2 pressed by the pressing unit 82.

The pressing unit 82 is configured with a pair of calendar rollers 85 and presses by pinching the second web W2 with predetermined nip pressure. As the second web W2 is pressed, the thickness is reduced and the density of the second web W2 is raised. One of the pair of calendar rollers 85 is a driving roller driven by a motor (not shown) and the other is a driven roller. The calendar roller 85 rotates by a driving force of a motor (not shown) and transports the second web W2 highly densified by the pressing to the heating unit 84.

The heating unit 84 can be configured with a heating roller (heater roller), a hot press molding machine, a hot plate, a warm air blower, an infrared heater, and a flash fixing device, for example. In the present embodiment, the heating unit 84 includes a pair of heating rollers 86. The heating roller 86 is heated to the predetermined temperature by a heater installed inside or outside. The heating roller 86 applies heat across the second web W2 pressed by the calendar roller 85 and forms the sheet S. Further, one of the pair of heating rollers 86 is a driving roller driven by a motor (not shown) and the other is a driven roller. The heating roller 86 rotates by the driving force of a motor (not shown) and transports the heated sheet S toward the cutting unit 90.

It should be noted that the number of the calendar rollers 85 included in the pressing unit 82 and the number of heating rollers 86 included in the heating unit 84 are not particularly limited.

The cutting unit 90 cuts the sheet S formed by the sheet formation unit 80. In the present embodiment, the cutting unit 90 includes a first cutting unit 92 that cuts the sheet S in a direction intersecting with the transport direction of the sheet S and a second cutting unit 94 that cuts the sheet S in a direction parallel to the transport direction. The second cutting unit 94 cuts the sheet S that has passed through the first cutting unit 92, for example.

The sheet S of a single slip of predetermined size is formed by the above. The cut sheet S of a single slip is discharged to a discharge unit 96. The discharge unit 96 includes a tray or a stacker on which the sheet S of a predetermined size is placed.

Figure 2:
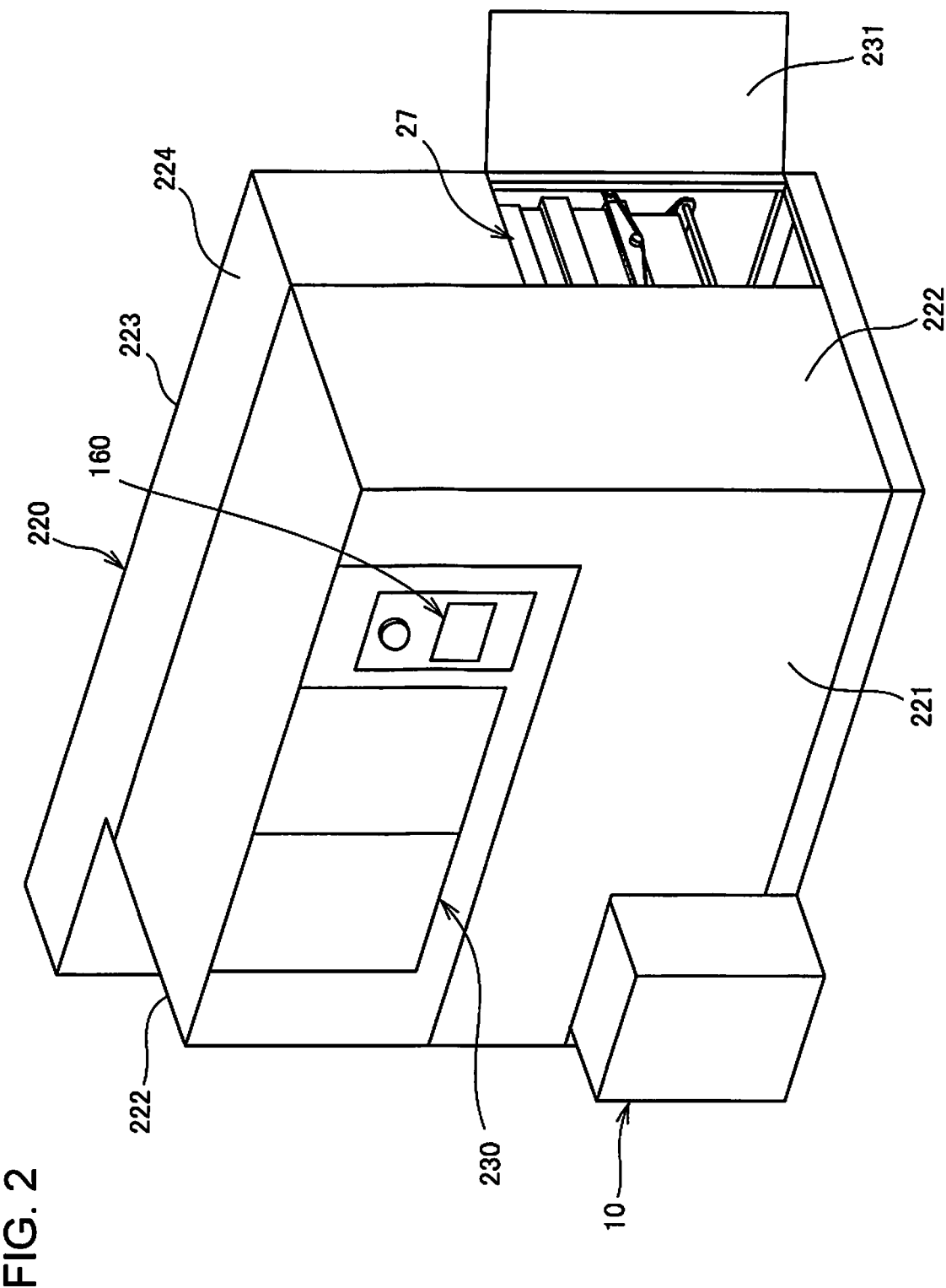
FIG. 2 is a view showing an appearance of the sheet manufacturing apparatus.

FIG. 2 is a view showing the appearance of the sheet manufacturing apparatus 100. As shown in FIG. 2, the sheet manufacturing apparatus 100 includes a casing body 220 that accommodates the above-described various components of the sheet manufacturing apparatus 100. The casing body 220 includes a front surface unit 221 constituting a front surface, a side surface unit 222 constituting right and left side surfaces, a rear surface unit 223 constituting a rear surface, and an upper surface unit 224 constituting an upper surface.

On the front surface unit 221, the supply unit 10 is provided partially exposed and a display unit 160 that displays various kinds of information and an opening/closing door 230 are provided. The display unit 160 includes a display panel capable of displaying various kinds of information and a touch panel disposed to overlap with the display panel and can detect an operation of a user by the touch panel. The opening/closing door 230 is a door that opens and closes so that a cartridge accommodating the additives can be exposed.

The right side surface unit 222 includes a dust collecting unit cover unit 231 that freely opens and closes to cover the dust collecting unit 27. Opening the dust collecting unit cover unit 231 enables access to a recovery box 261 from outside included in the dust collecting unit 27 and to be described below. The dust collecting unit cover unit 231 can be held in a closed state by an electromagnetic lock 235 (FIG. 3).

Figure 3:
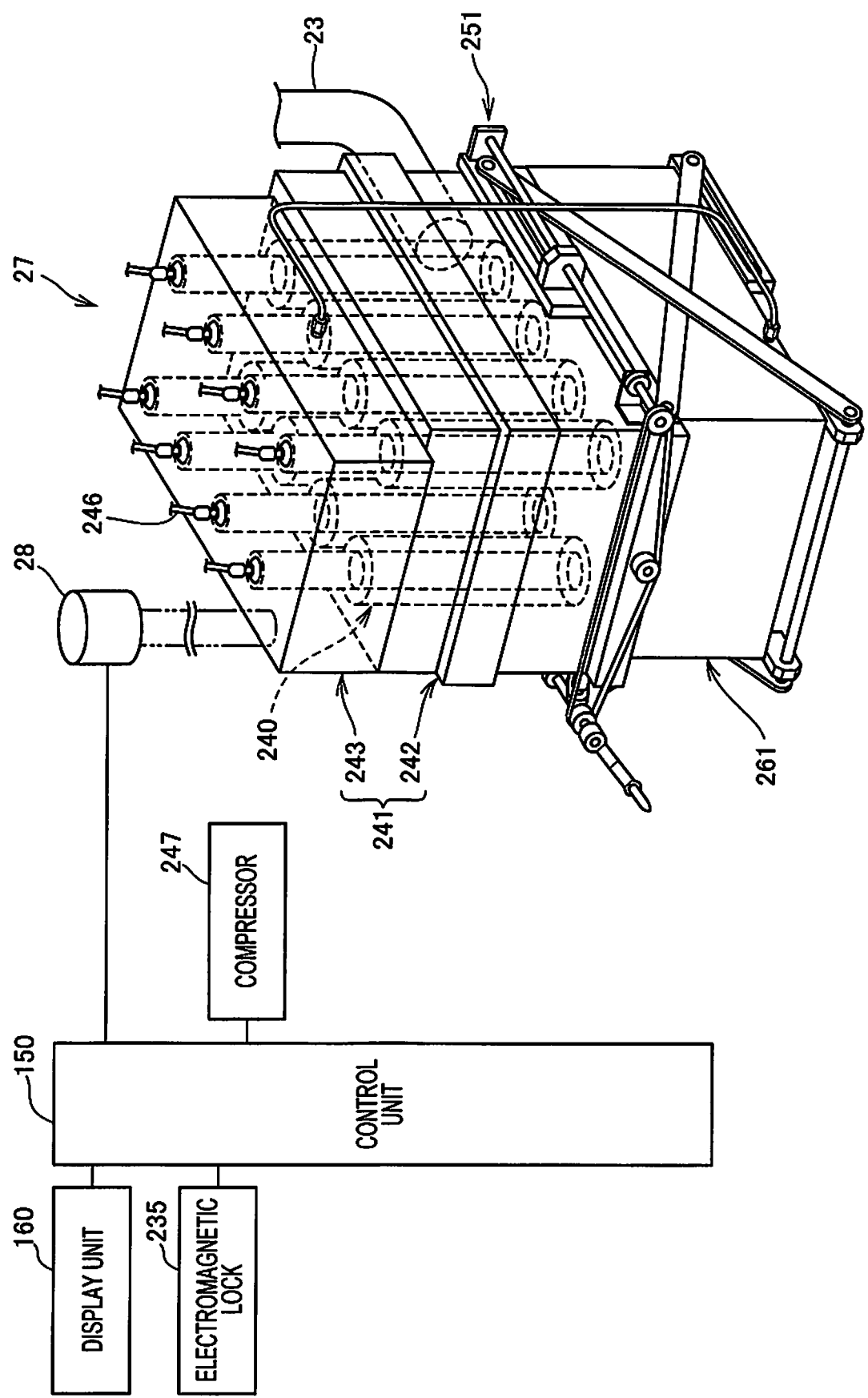
FIG. 3 is a view showing a dust collecting unit together with a peripheral configuration.
Figure 4:
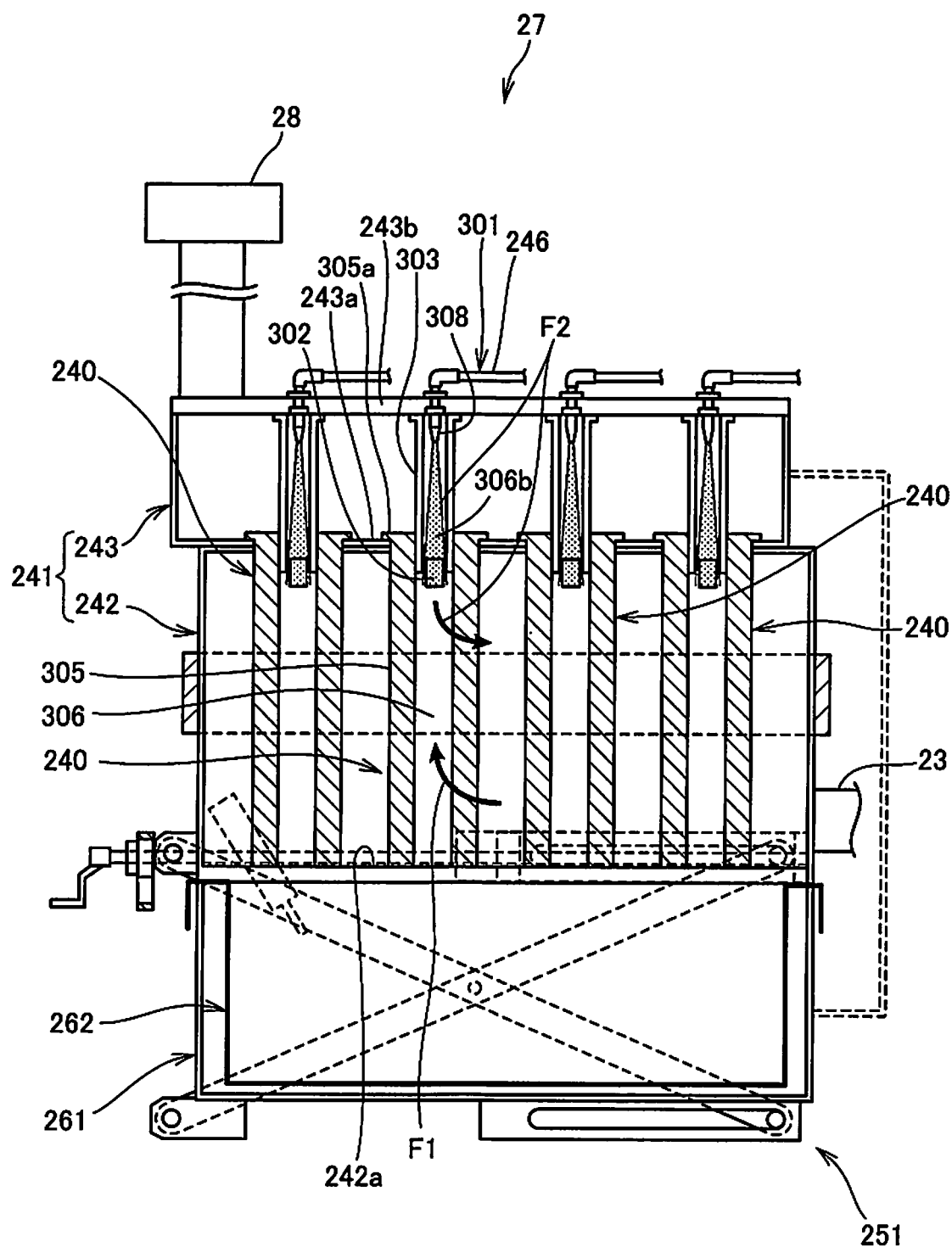
FIG. 4 is a view showing an internal structure of the dust collecting unit.

FIG. 3 is a view showing the dust collecting unit 27 together with a peripheral configuration. Further, FIG. 4 is a view showing the internal structure of the dust collecting unit 27. The sheet manufacturing apparatus 100 includes a control unit 150 (FIG. 3) that controls various parts of the sheet manufacturing apparatus 100 including the dust collecting unit 27, the display unit 160, and an electromagnetic lock 235.

As shown in FIGS. 3 and 4, the dust collecting unit 27 includes a collection unit 241 that uses a filter 240 and collects removal target material from the air including the removal target material which is not used in the manufacturing of the sheet S and a recovery box 261 connected to the collection unit 241 freely ascending and descending by an ascending/descending mechanism 251.

The collection unit 241 includes a first casing body 242 that accommodates a plurality of filters 240 and a second casing body 243 that is provided above the first casing body 242 and forms a chamber into which that air from which the removal target material is removed by the filter 240 flows. In the first casing body 242, the tube 23 leading to a lower part of the mesh belt 46 of the first web formation unit 45 (FIG. 1) is connected. In the second casing body 243, the collection blower 28 that functions as a dust collecting suction unit is connected.

The collection blower 28 operates by the control of the control unit 150. The collection blower 28 is positioned downstream of the filter 240 and sucks air in the second casing body 243. That is, the collection blower 28 is positioned downstream of the filter 240 and sucks the air that includes the removal target material of the lower part of the mesh belt 46 through the tube 23 into the first casing body 242 to communicate with through the filter 240.

A plurality (eight in this configuration) of filters 240 are provided at intervals from each other in the first casing body 242.

These filters 240 have hollow cylindrical shapes, and the in-cylinder space 306 of each filter 240 communicates with the second casing body 243. When the collection blower 28 operates, the air including the removal target material that has flown into the first casing body 242 from the tube 23 is collected by each filter 240 while passing through the filter 240 as indicated by the air current F1 in FIG. 4. The air from which the removal target material is removed by the filter 240 passes through the in-cylinder space 306 of each filter 240 and flows into the second casing body 243. The air that has passed through the collection blower 28 from the inside of the second casing body 243 is discharged to the outside of the sheet manufacturing apparatus 100.

In the present configuration, by providing a plurality of tubular cylindrical filters 240, it is possible to secure the filter surface area efficiently. It should be noted that the shape and the number of filter 240 may be appropriately varied. For example, the filter 240 may have a polygonal cylindrical shape.

The sheet manufacturing apparatus 100 is provided with a backwash structure (backwash mechanism) that backwashes the removal target material collected by the filter 240 and washes the filter 240. Here, backwash refers to an operation, processing or a step of blowing off the removal target material adhering to the filter 240 by backwash air current F2 that includes a vector of a direction opposite to the air current F1 while the removal target material is collected by the filter 240.

The above backwash structure includes an air current generation unit 301 that generates the backwash air current F2, a backwash auxiliary member 302 disposed in the filter 240, and a holding member 303 that holds the backwash auxiliary member 302.

Figure 5:
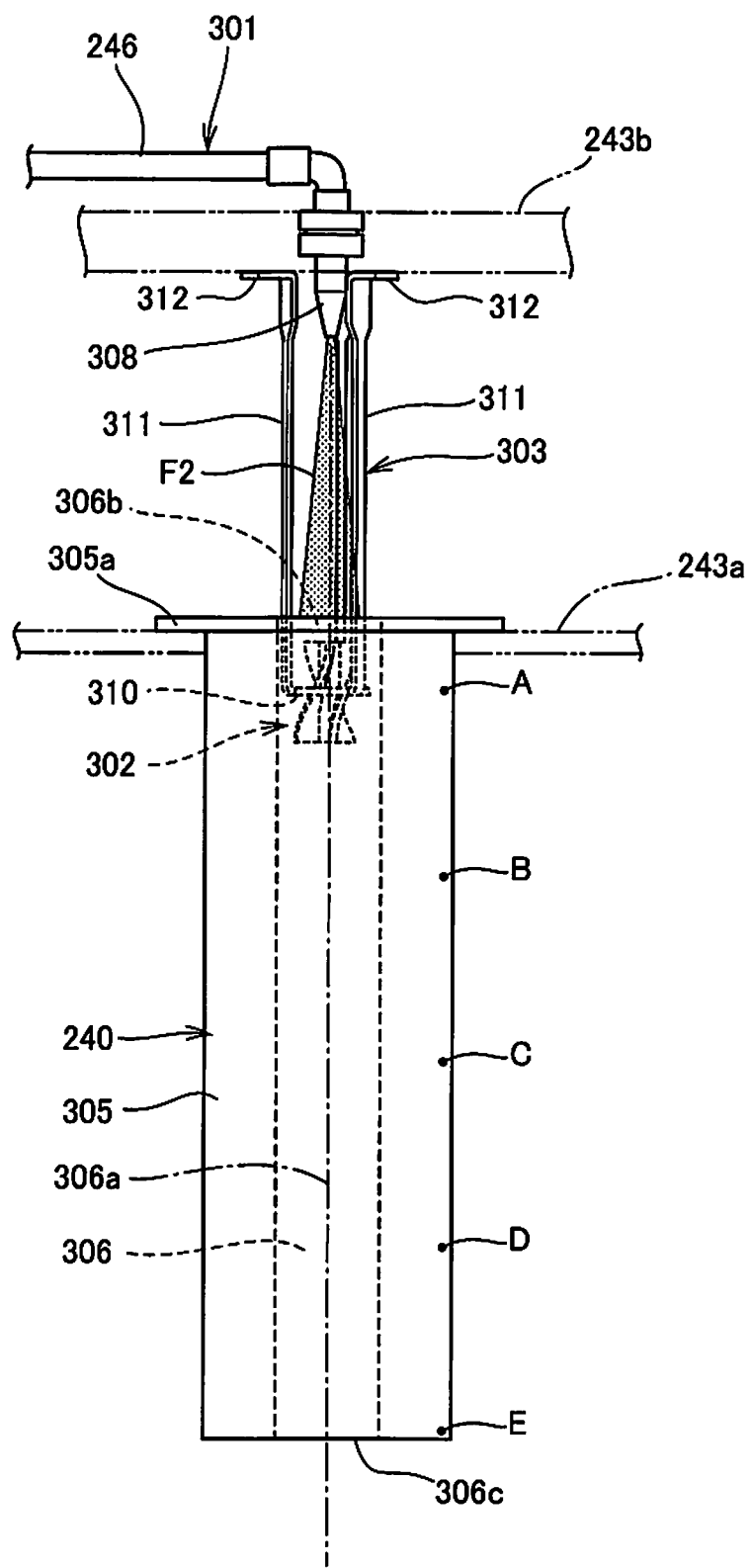
FIG. 5 is a side view of peripheral units of a filter in a backwash structure.
Figure 6:
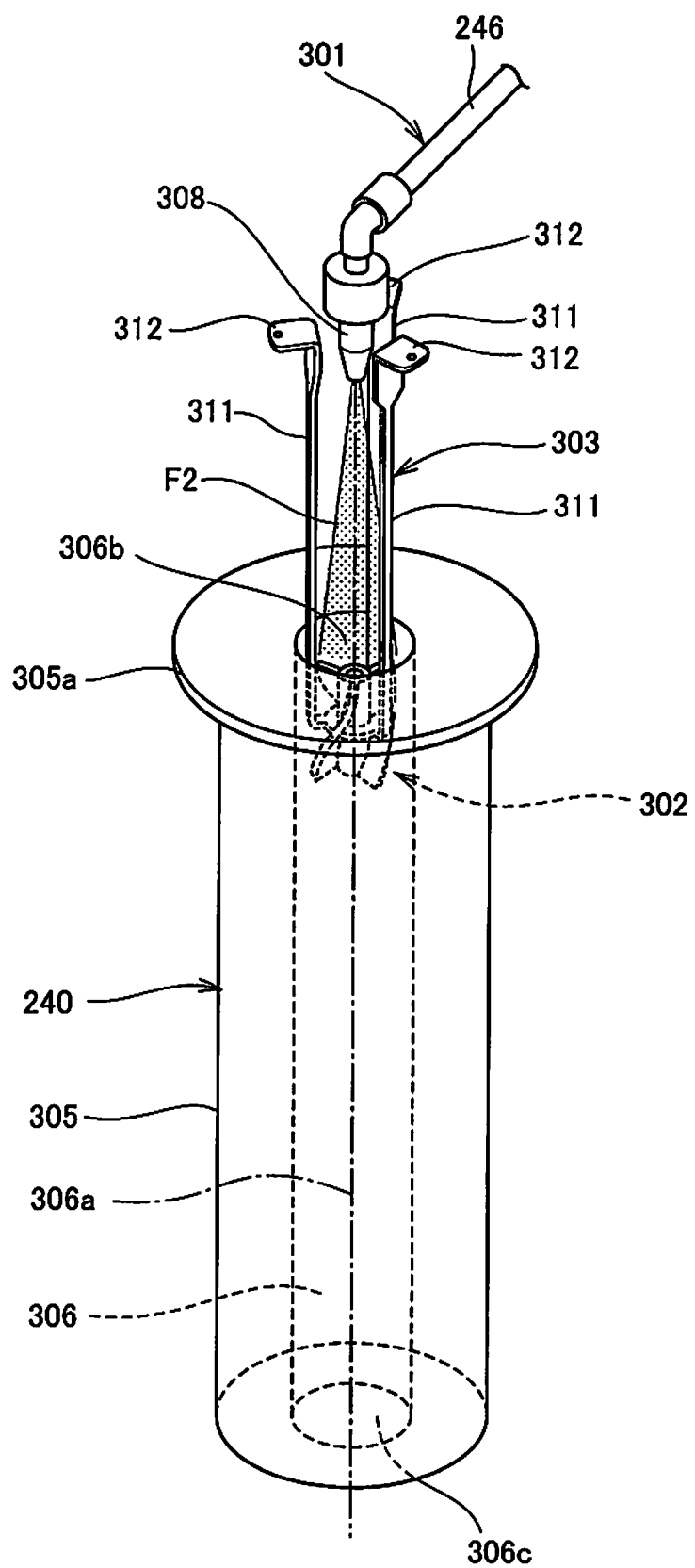
FIG. 6 is a perspective view showing the peripheral units of the filter in the backwash structure.

FIG. 5 is a side view of peripheral units of a filter 240 in a backwash structure. FIG. 6 is a perspective view of the peripheral units of the filter 240 in the backwash structure.

As shown in FIGS. 4 to 6, the filter 240 includes tubular cylindrical body 305 and an in-cylinder space 306 (in cylinder) partitioned by an inner circumferential portion positioned at the center of the cylindrical body 305. The in-cylinder space 306 is a circular sectional space extending in the axial direction of the cylindrical body 305. The center axis 306a of the in-cylinder space 306 coincides with the center axis of the cylindrical body 305.

The cylindrical body 305 includes a flange unit 305a that protrudes outwardly in the radial direction from an upper end of the outer peripheral portion. The cylindrical body 305 is erected upward from the bottom surface 242a of the first casing body 242. The upper end of the cylindrical body 305 penetrates a bottom surface 243a of the second casing body 243 and is provided in the second casing body 243, and the flange unit 305a is fixed to the bottom surface 243a.

The upper surface opening 306b of the in-cylinder space 306 communicates with the space in the second casing body 243. The air current F1 flows from the upper surface opening 306b into the second casing body 243.

The air current generation unit 301 includes a nozzle 308 that ejects the backwash air current F2 which is compressed air toward the upper surface opening 306b, a compressor 247 (FIG. 3) that generated the compressed air, a compressed air tube 246 that connects the nozzle 308 and the compressor 247, and a valve (not shown).

The nozzle 308 is provided at a position spaced upward from the upper surface opening 306b of the filter 240 and is supported by an upper surface 243b (supporting wall) of the second casing body 243. The ejection port of the nozzle 308 is positioned on the extension line of the center axis 306a of the in-cylinder space 306. That is, the compressed air is ejected toward the center of the upper surface opening 306b.

The control unit 150 (FIG. 3) operates the valve at an appropriate timing (for example, each time predetermined time has passed) during normal operation and supplies the compressed air to the nozzle 308. The backwash air current F2 ejected downward from the nozzle 308 flows from the upper surface opening 306b into the in-cylinder space 306 and passes from the in-cylinder space 306 radially outward of the cylindrical body 305 to flow into the first casing body 242. The removal target material collected in the cylindrical body 305 is peeled from the cylindrical body 305 by the backwash air current F2 and falls downward by gravity. The fallen removal target material is collected in a collection bag 262 attached to the recovery box 261.

Figure 7:
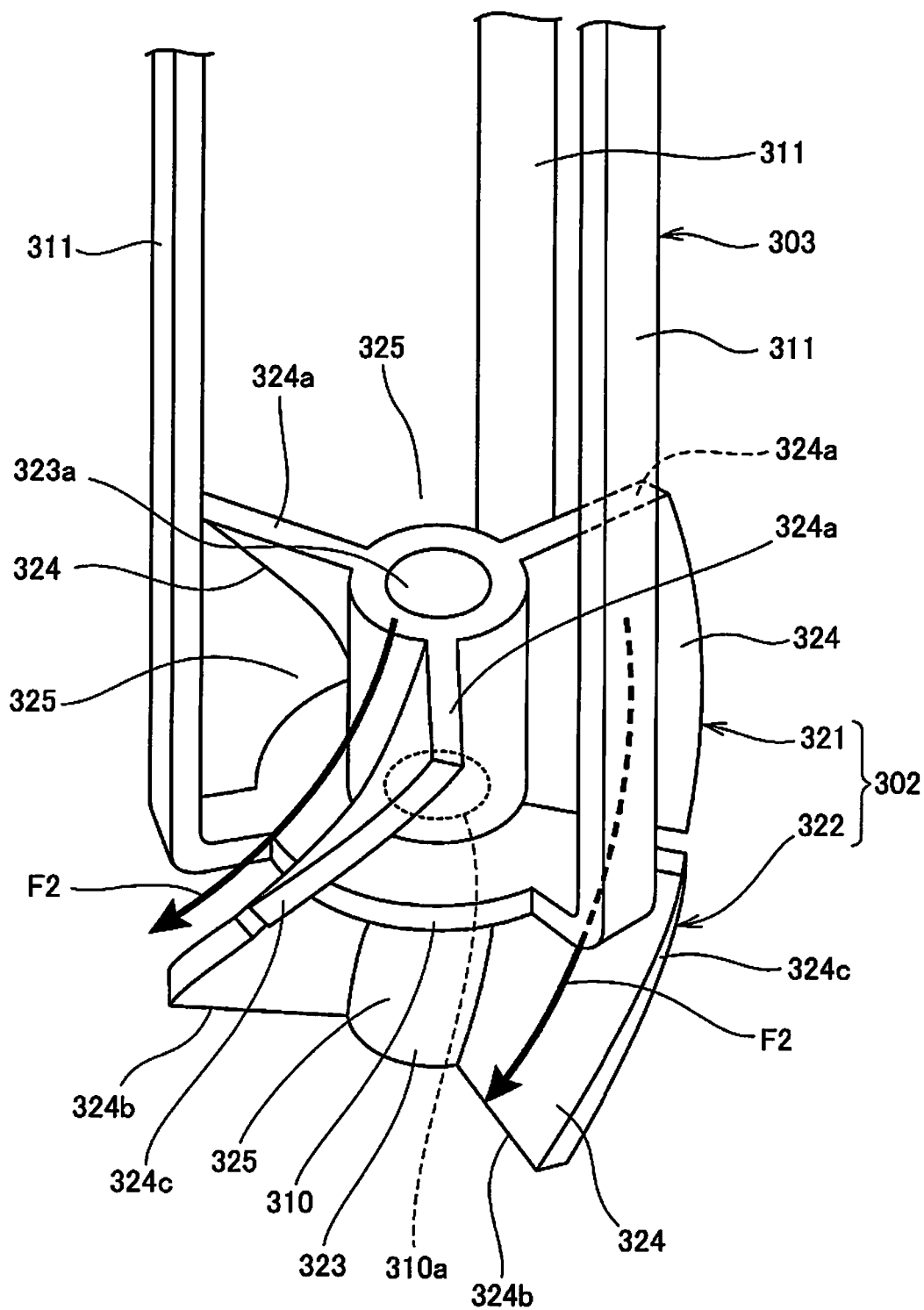
FIG. 7 is a perspective view showing a backwash auxiliary member attached to a holding member.

FIG. 7 is a perspective view showing the backwash auxiliary member 302 attached to a holding member 303.

As shown in FIGS. 4 to 7, the holding member 303 includes a holding unit 310 which is disposed in the in-cylinder space 306 and to which the backwash auxiliary member 302 is attached and a plurality of extension units 311 which extend from the holding unit 310 to the nozzle 308 side (upward) along the center axis 306a. Further, the holding member 303 includes a fixing unit 312 which extends from the upper end of the extension unit 311 radially outward of the filter 240.

The holding unit 310 is formed in a disc shape disposed approximately orthogonal to the center axis 306a and disposed coaxially with the center axis 306a.

A hole 310a is formed at the center of the holding unit 310, penetrating the holding unit 310 in the plate thickness direction (axial direction of the center axis 306a).

The holding unit 310 is disposed in the vicinity of the upper surface opening 306b in the in-cylinder space 306. That is, the holding unit 310 provided in the vicinity of the upper surface opening 306b, which is the upstream end of the flow of the backwash air current F2 in the filter 240.

The extension unit 311 is formed in a rod shape extending upward from the outer peripheral portion of the disc-shaped holding unit 310 approximately parallel to the center axis 306a. A plurality of extension units 311 are provided at approximately equal intervals from each other in the circumferential direction of the holding unit 310. Therefore, the intervening portion between the extension units 311 adjacent to each other in the holding member 303 is an open portion.

The holding member 303 is attached to the second casing body 243 by the fixing unit 312 at the upper end of each extension unit 311 being fixed to the lower surface of the upper surface 243b of the second casing body 243. That is, the holding member 303 is supported to the upper surface 243b of the second casing body 243 that supports the nozzle 308 and is disposed so as to be suspended from the upper surface 243b toward the in-cylinder space 306.

The plurality of extension units 311 are disposed so as to surround the backwash air current F2 from the periphery and most of the backwash air current F2 passes through a space surrounded by the plurality of extension units 311 to flow into the upper surface opening 306b.

The backwash auxiliary member 302 is supported by the holding member 303 and is disposed at the upper end portion of the in-cylinder space 306, that is, in the portion of the in-cylinder space 306 in the vicinity of the upper surface opening 306b. The entire backwash auxiliary members 302 are disposed in the in-cylinder space 306, but at least a part thereof may be disposed in the in-cylinder space 306.

The first backwash auxiliary member 321 and the second backwash auxiliary member 322 formed by division are combined side by side in the axial direction of the center axis 306a so that the backwash auxiliary member 302 is formed.

In detail, the first backwash auxiliary member 321 is provided on the upper surface of the holding unit 310 of the holding member 303 and the second backwash auxiliary member 322 is provided on the lower surface of the holding unit 310. The second backwash auxiliary member 322 is positioned downstream of the first backwash auxiliary member 321 in the flowing direction of the backwash air current F2. It should be noted that the first backwash auxiliary member 321 and the second backwash auxiliary member 322 may be integrally formed to constitute the backwash auxiliary member 302.

The backwash auxiliary member 302 includes a shaft-shaped center unit 323 extending in the axial direction of the center axis 306a of the in-cylinder space 306 and a plurality (three in the present embodiment) of rectification units 324 extending spirally in the axial direction of the center axis 306a.

The center unit 323 is formed in a tubular cylindrical shape and includes a through hole 323a penetrating the center unit 323 in the axial direction. The outer diameter of the center unit 323 is smaller than the outer diameter of the holding unit 310 of the holding member 303.

The rectification unit 324 is formed in a blade shape that extends spirally in the axial direction (in lengthwise direction of the filter 240) of the center axis 306a along the center unit 323 while extending radially outward from the outer peripheral surface of the center unit 323.

The rectification unit 324 is provided over the approximately entire center unit 323 in the axial direction. A plurality of the rectification units 324 are provided at intervals from each other in the circumferential direction of the center unit 323, and the space 325 is formed between the adjacent rectification units 324 and 324. The extension unit 311 of the holding member 303 passes through the space 325 in the vertical direction.

Each rectification unit 324 extends spirally along the center unit 323 from the upstream end 324a to the downstream end 324b, but is provided over a part of the center unit 323 in the circumferential direction without making a round around the outer circumference of the center unit 323.

The radial outer end 324c of each rectification unit 324 extends to the vicinity of the inner peripheral portion of the cylindrical body 305.

The backwash auxiliary member 302 is fixed by a fixing tool (for example, bolt) (not shown) inserted into the through hole 323a of the center unit 323 and the hole 310a of the holding member 303. In detail, the backwash auxiliary member 302 is fixed to the holding member 303 as the holding unit 310 is pinched by the first backwash auxiliary member 321 and the second backwash auxiliary member 322.

In this case, as shown in FIG. 7, it is preferable that the first backwash auxiliary member 321 and the second backwash auxiliary member 322 be disposed such that the spiral rectification unit 324 included in each continues smoothly in the axial direction of the center axis 306a. It should be noted that the first backwash auxiliary member 321 and the second backwash auxiliary member 322 may be disposed in the circumferential direction such that the rectification unit 324 of the first backwash auxiliary member 321 and the rectification unit 324 of the second backwash auxiliary member 322 are discontinuous.

When the backwash air current F2 which is compressed air is ejected from the nozzle 308, the backwash air current F2 passes through the space among the plurality of extension units 311 to enter into the in-cylinder space 306 from the upper surface opening 306b and is rectified while passing through the backwash auxiliary member 302. The backwash air current F2 passing through the backwash auxiliary member 302 becomes a swirling current flowing outside of the filter 240 in the radial direction and in the axial direction of the filter 240 while rotating around the center axis 306a along each spiral rectification unit 324.

The backwash air current F2 that has become a swirling current by the backwash auxiliary member 302 flows to a downstream end (lower end) of the filter 240 while weakening the rotation around the center axis 306a and escapes from the in-cylinder space 306 to the outer side of the outer peripheral surface of the cylindrical body 305 over the entire part from the upper surface opening 306b to a downstream end 306c of the in-cylinder space 306.

Figure 8:
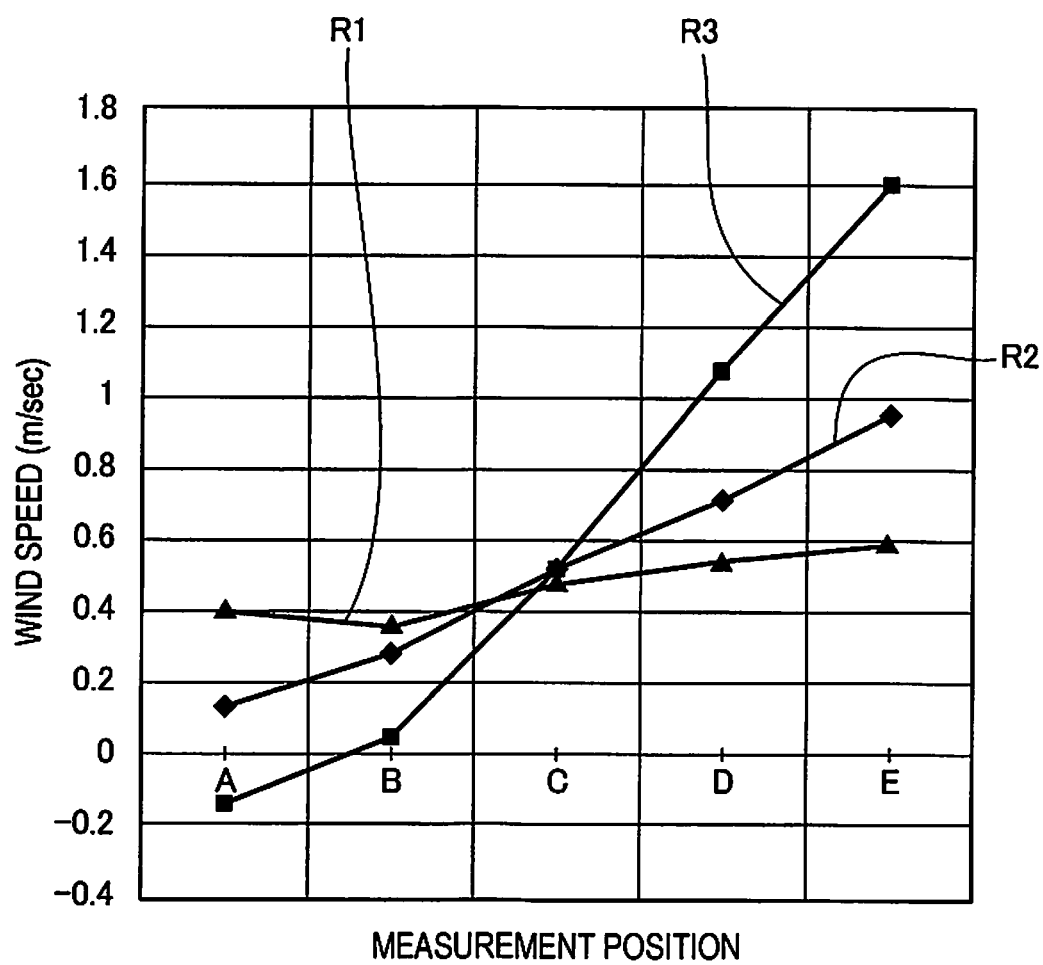
FIG. 8 is a chart showing wind speed of backwash air current at each position in the axial direction of the filter.

FIG. 8 is a chart showing the wind speed of the backwash air current F2 at each position in the axial direction of the filter 240.

FIG. 8 shows an example in which the backwash auxiliary member 302 of the present embodiment is applied to the dust collecting unit 27 and the wind speed is measured by the applicant. Further, FIG. 8 shows the measurement result of a case where the backwash auxiliary member of the related art is applied to the dust collecting unit 27 as a comparison example.

In detail, the wind speed distribution R1 of a case where the backwash auxiliary member 302 of the present embodiment is applied to the in-cylinder space 306, the wind speed distribution R2 (comparison example) of a case where the backwash auxiliary member of the related art is provided, and the wind speed distribution R3 (comparison example) of a case where the backwash auxiliary member is not provided are presented. The backwash auxiliary member of the related art is a circular columnar backwash auxiliary member and includes a conical upper end contraction unit that shrinks in diameter and tapers toward an upstream end at the end portion of upstream in the flow of the backwash air current F2.

In FIG. 8, the vertical axis indicates the wind speed of the backwash air current F2 and the horizontal axis indicates the measurement position of the wind speed of the backwash air current F2. The positions A to E indicated on the horizontal axis in FIG. 8 indicate the positions in height direction from the upper surface opening 306b to the downstream end 306c as shown in FIG. 5. The position A is a position in the vicinity of the upper surface opening 306b, the position E is position in the vicinity of the downstream end 306c, and the positions B to D are positions provided at approximately equal intervals between the position A to the position E in the axial direction of the filter 240. FIG. 8 shows the measurement result of the wind speed of the backwash air current F2 immediately after escaping from the in-cylinder space 306 to the outer peripheral surface of the cylindrical body 305 in the position A to the position E.

In the wind speed distribution R3 of the case where the backwash auxiliary member is not provided, the wind speed is a negative value at the position A, and the air current that flows from the outer peripheral surface of the cylindrical body 305 into the in-cylinder space 306 is generated at the position A. This is because the flowing speed of the backwash air current F2 is high at the position A close to the nozzle 308 and negative pressure is generated by the backwash air current F2 in the vicinity of the position A. In this case, since the air current that escapes from the in-cylinder space 306 to the other peripheral surface of the cylindrical body 305 is generated at the position A, it is difficult to peel the removal target material by the backwash.

Further, in the wind speed distribution R3, the wind speed of the backwash air current F2 rises as the current drifts from the position A to the position E downstream, but the wind speed of the backwash air current F2 is low at the positions A and B close to the upper surface opening 306b. Therefore, it is difficult to remove the removal target material by the backwash effectively at the positions A and B.

In the wind speed distribution R2 of the case where the backwash auxiliary member of the related art is provided, the wind speed is a positive value at the position A. This is because the backwash air current F2 is dispersed to flow outside of the backwash auxiliary member in the radial direction along the conical upper end contraction unit formed at the upstream end of the backwash auxiliary member and the generation of negative pressure is suppressed.

Further, in the wind speed distribution R2, the wind speed of the backwash air current F2 rises as the current drifts from the position A to the position E downstream. However, the wind speed of the backwash air current F2 is low at the position A and B close to the upper surface opening 306b, and furthermore, in the wind distribution R2, the wind speed is not approximately uniform from the position A to the position E.

In the wind speed distribution R1 of the case where the backwash auxiliary member 302 is provided, the wind speed is a positive value at the position A and the wind speed sufficiently high to peel the removal target material by the backwash effectively is obtained. This is because a part of the swirling current generated by the backwash auxiliary member 302 strongly flows to the outside in the radial direction of the filter 240.

Further, in the wind distribution R1, the wind speed of the backwash air current F2 rises slightly as the current drifts from the position A to the position E downstream, but the approximately uniform wind speed from the position A to the position E is obtained.

Therefore, it is possible to supply the approximately uniform backwash air current F2 to the approximately entire filter 240 in the axial direction, and it is possible to backwash the entire filter 240 approximately uniformly.

As described above, the dust collecting unit 27 of the embodiment to which the present invention is applied includes the cylindrical filter 240, the backwash auxiliary member 302 disposed at the end portion of the filter 240 and disposed in the in-cylinder space 306 of the filter 240, and the air current generation unit 301 that generates the backwash air current F2 which passes through the backwash auxiliary member 302 and flows into the in-cylinder space 306 of the filter 240, and the backwash auxiliary member 302 includes the rectification unit 324 that extends spirally in the axial direction of the filter 240.

The dust collecting unit 27 of the embodiment to which the present invention is applied includes a cylindrical filter 240, the backwash auxiliary member 302 that is disposed at the end portion of the filter 240 and of which at least a part is disposed in the in-cylinder space 306 of the filter 240, and the air current generation unit 301 that generates the backwash air current F2 that passes through the backwash auxiliary member 302 and flows into the in-cylinder space 306 of the filter 240, and the backwash auxiliary member 302 includes the center unit 323 that extends in the axial direction of the filter 240 and the rectification unit 324 that extends in a blade shape from the center unit 323 and, tilting with respect to the axial direction of the filter 240, extends in the axial direction.

In this way, while rotating around the axis of the filter 240 along the spiral rectification unit 324 included in the backwash auxiliary member 302, the backwash air current F2 flows outside of the filter 240 in the radial direction (direction intersecting with the center axis 306a and away from the center axis 306a) and in the axial direction of the filter 240. Therefore, while it is possible to suppress the generation of negative pressure at the end portion of the filter 240 where the backwash auxiliary member 302 is disposed, it is possible to supply the approximately uniform backwash air current F2 to the approximately entire filter 240 in the axial direction and it is possible to backwash the entire filter 240 approximately uniformly.

Further, the backwash auxiliary member 302 includes the center unit 323 that extends along the center axis 306a of the in-cylinder space 306 (filter 240), and the rectification unit 324 is formed in a blade shape that extends spirally in the axial direction of the center axis 306a along the center unit 323 while extending in the radial direction (outward) from the center unit 323. In this way, since the backwash air current F2 flows along the rectification unit 324 in a blade shape that extends spirally in the axial direction of the center axis 306a of the in-cylinder space 306 outside of the filter 240 in the radial direction (direction intersecting with the center axis 306a and away from the center axis 306a) and in the axial direction of the filter 240 while rotating around the filter 240, it is possible to backwash the entire filter 240 approximately uniformly. Further, it is possible to form the backwash auxiliary member 302 in a simple shape that extends the blade-shaped rectification unit 324 from the center unit 323 with high efficiency of backwashing.

Further, since a plurality of the rectification units 324 are provided at intervals from each other in the circumferential direction of the center unit 323, the backwash air current F2 can flow between the plurality of blade-shaped rectification units 324 in the axial direction of the filter 240. Therefore, it is possible to prevent the rectification unit 324 from resisting the backwash air current F2 highly, and it is possible to backwash the entire filter 240 approximately uniformly.

Further, the air current generation unit 301 includes the nozzle 308 that ejects the compressed air to be the backwash air current F2 toward the backwash auxiliary member 302, and the backwash auxiliary member 302 is held by the holding member 303 that extends into the in-cylinder space 306 of the filter 240 in the ejection direction of the compressed air from the upper surface 243b which is the supporting wall that holds the nozzle 308. In this way, since it is possible to suppress the hindrance of the backwash air current F2 by the holding member 303 that holds the backwash auxiliary member 302, it is possible to backwash the entire filter 240 approximately uniformly.

Further, in the dust collecting unit 27, the backwash auxiliary member 302 rectifies the backwash air current F2 from the air current generation unit 301 in the in-cylinder space 306 and turns into a swirling current that swirls around the center axis 306a of the in-cylinder space 306 (filter 240). In this way, the backwash air current F2 is rectified by the backwash auxiliary member 302 to become a swirling current and flows outside of the filter 240 in the radial direction (direction intersecting with the center axis 306a away from the center axis 306a) and in the axial direction of the filter 240 while rotating the in-cylinder space 306 around the center axis 306a. Therefore, while it is possible to prevent the generation of negative pressure at the end portion of the filter 240 where the backwash auxiliary member 302 is disposed, it is possible to supply the approximately uniform backwash air current to the approximately entire filter 240 in the axial direction, and it is possible to backwash the entire filter 240 approximately uniformly.

Further, the sheet manufacturing apparatus 100 includes the sheet formation unit 80 that forms the sheet S from a raw material including a fiber and the dust collecting unit 27 that recovers the removal target material out of the raw material, which, without being used in the manufacturing of the sheet S, is recovered, the dust collecting unit 27 includes the cylindrical filter 240, the backwash auxiliary member 302 disposed at the end portion of the filter 240 and disposed in the in-cylinder space 306 of the filter 240, and the air current generation unit 301 that generated the backwash air current F2 that passes through the backwash auxiliary member 302 and flows into the in-cylinder space 306 of the filter 240, and the backwash auxiliary member 302 includes the rectification unit 324 that extends spirally in the axial direction of the center axis (center axis 306a of the in-cylinder space 306) of the filter 240. Therefore, it is possible to backwash the entire filter 240 approximately uniformly.

It should be noted that the embodiments described above are no more than specific aspects of executing the present invention described in the claims and do not limit the present invention and that the entire configurations described in the above embodiments are not limited to the essential configuration requirements of the present invention. Further, the present invention is not limited to the configuration of the embodiments described above and can be executed in various aspects within a range without deviating from the gist thereof.

The rectification unit 324 may extend in the axial direction of the filter 240, preferably in a spiral shape, and the shape is not limited to the embodiment described above. For example, the rectification unit 324 may be an approximately flat blade that extends spirally, and may be a curved blade that extends spirally in the axial direction of the filter 240.

Further, the rectification unit 324 is not limited to a spiral shape and may extend in a wing shape (blade shape) from the center unit 323 and, tilting with respect to the axial direction of the filter 240, extend in the axial direction. By making the rectification unit 324 in a wind shape, it is possible to make sectional area of the rectification unit 324 in the direction orthogonal to the center axis 306a (flow direction of the backwash air current F2 ejected from nozzle 308) as small as possible, so that the flow of the backwash air current F2 in the axial direction (axial direction of the center axis 306a) of the filter 240 is not hindered more than necessary. Further, by tilting the rectification unit 324 with respect to the axial direction (axial direction of the center axis 306a) of the filter 240, it is possible for a part of the backwash air current F2 to flow outside of the filter 240 in the radial direction (direction intersecting with the center axis 306a and away from the center axis 306a) to be rectified and it is possible to prevent the generation of the negative pressure at an end portion of the filter 240 where the backwash auxiliary member 302 is disposed. Therefore, it is possible to supply the backwash air current F2 over the entire filter 240 in the axial direction approximately uniformly, and it is possible to backwash the entire filter 240 approximately uniformly.

Further, in the embodiment describes above, three rectification units 324 are provided, but the number of the rectification unit 324 may be changed. In this case, the number of the rectification unit 324 may be changed depending on the position in the axial direction (for example, by the first backwash auxiliary member 321 and the second backwash auxiliary member). Further, the rectification units 324 may be tilted at different angles depending on the position in the axial direction and the radial direction. Further, the backwash auxiliary member 302 may be provided over the entire filter 240 (entire in-cylinder space 306) in the axial direction or may be provided only in a part in the axial direction.

Further, the backwash auxiliary member 302 may be provided to be rotatable around an axis inserted into the through hole 323a of the center unit 323, or the configuration may be such that the backwash auxiliary member 302 is rotated by the force of the backwash air current F2. Further, a plurality of rotatable backwash auxiliary members may be provided such that the rotation directions of the backwash auxiliary members are different from one another.

Further, in the above embodiment, the backwash auxiliary member 302 is fixed to the holding member 303 by fixing tool (not shown) inserted into the through hole 323a of the center unit 323, but the backwash auxiliary member 302 may be fixed by another method (for example, adhesion). In this case, since it is not necessary to provide a through hole 323a in the center unit 323 and the diameter can be made small, it is possible to suppress the resistance of the center unit 323 against the backwash air current F2.

Further, the sheet manufacturing apparatus 100 is not limited to the sheet S, and may be configured to manufacture board-shaped or web-shaped products made of hard sheets or stacked sheets. Further, in the sheet S, the paper may be made from pulp or waste paper as a raw material, or may be a nonwoven fabric including natural fiber or synthetic resin fiber. Further, the property of the sheet S is not particularly limited, and may be paper that can be used as recording paper (for example, so-called PPC paper) for writing or printing, wall paper, wrapping paper, color paper, drawing paper, Kent paper, or the like. Further, when the sheet S is a nonwoven fabric, it may be a fiber board, tissue paper, kitchen paper, a cleaner, a filter, a liquid absorbing material, a sound absorbing material, a shock absorbing material, a mat, or the like in addition to a regular nonwoven fabric.

REFERENCE SIGNS LIST

10 . . . supply unit
20 . . . defibrillation unit
27 . . . dust collecting unit (dust collecting device)
40 . . . sorting unit
45 . . . the first web formation unit
50 . . . mixing unit
52 . . . additive supply unit
60 . . . accumulation unit
70 . . . the second web formation unit
79 . . . transport unit
80 . . . sheet formation unit
82 . . . pressing unit
84 . . . heating unit
90 . . . cutting unit
96 . . . discharge unit
100 . . . sheet manufacturing apparatus
150 . . . control unit
160 . . . display unit
202, 204, 206, 208, 210, 212 . . . humidification unit
220 . . . casing body
231 . . . dust collecting unit cover unit
235 . . . electromagnetic lock
240 . . . filter
241 . . . collection unit
242 . . . the first casing body
242a . . . bottom surface
243 . . . the second casing body
243a . . . bottom surface
243b . . . upper surface (supporting wall)
246 . . . compressed air tube
247 . . . compressor
251 . . . ascending/descending mechanism
261 . . . recovery box
262 . . . collection bag
301 . . . air current generation unit
302 . . . backwash auxiliary member
303 . . . holding member
305 . . . cylindrical body
305a . . . flange unit
306 . . . in-cylinder space (in cylinder)
306a . . . center axis
306b . . . upper surface opening
306c . . . downstream end
308 . . . nozzle
310 . . . holding unit
310a . . . hole
311 . . . extension unit
312 . . . fixing unit
321, 322 . . . backwash auxiliary member
323 . . . center unit
323a . . . through hole
324 . . . rectification unit
324a . . . upstream end
324b . . . downstream end
324c . . . outer end
325 . . . space
F2 . . . backwash air current
S . . . sheet

The invention claimed is:

1. A dust collecting device comprising:
a cylindrical filter;
a backwash auxiliary member that is disposed at an end portion of the filter and of which at least a part is disposed in a cylinder of the filter;
an air current generation unit that generates a backwash air current that passes through the backwash auxiliary member and flows into the cylinder of the filter; and
a holding member that holds the backwash auxiliary member, the holding member including a holding unit that is disposed inside of the filter and has a first surface and a second surface, the second surface facing in an opposite direction of the first surface in a direction of the backwash air current and being positioned downstream relative to the first surface in the direction of the backwash air current,
the backwash auxiliary member including
a first backwash auxiliary member that is attached to the first surface of the holding unit, and
a second backwash auxiliary member that is attached to the second surface of the holding unit and is disposed downstream relative to the first backwash auxiliary member in the direction of the backwash air current such that the holding unit is disposed between the first and second backwash auxiliary members in the direction of the backwash air current,
each of the first and second backwash auxiliary members includes a rectification unit that extends spirally in an axial direction of a center axis of the filter.

2. The dust collecting device according to claim 1,
wherein each of the first and second backwash auxiliary members includes a center unit that extends along the center axis of the filter, and the rectification unit is formed in a blade shape that extends spirally in the axial direction of the center axis along the center unit while extending outward from the center unit.

3. The dust collecting device according to claim 2,
wherein a plurality of the rectification units are provided at intervals from each other in a circumferential direction of the center unit.

4. The dust collecting device according to claim 1,
wherein the air current generation unit includes a nozzle that ejects compressed air to be backwash air current toward the backwash auxiliary member, and
the holding member further includes an extension unit that extends in an ejection direction of the compressed air from a supporting wall that supports the nozzle into the cylinder of the filter.

5. A dust collecting device comprising:
a cylindrical filter;
a backwash auxiliary member that is disposed at an end portion of the filter and of which at least a part is disposed in a cylinder of the filter;

an air current generation unit that generates backwash air current that passes through the backwash auxiliary member and flows into the cylinder of the filter; and a holding member that holds the backwash auxiliary member, the holding member including a holding unit that is disposed inside of the filter and has a first surface and a second surface, the second surface facing in an opposite direction of the first surface in a direction of the backwash air current and being positioned downstream relative to the first surface in the direction of the backwash air current, the backwash auxiliary member including
a first backwash auxiliary member that is attached to the first surface of the holding unit, and
a second backwash auxiliary member that is attached to the second surface of the holding unit and is disposed downstream relative to the first backwash auxiliary member in the direction of the backwash air current such that the holding unit is disposed between the first and second backwash auxiliary members in the direction of the backwash air current, wherein the backwash auxiliary member rectifies air current from the air current generation unit in the cylinder and turns the rectified air current into a swirling current that swirls around a center axis of the filter.

6. A sheet manufacturing apparatus comprising:
a sheet formation unit that forms a sheet from a raw material including a fiber; and
a dust collecting device that recovers a removal target material, out of the raw material, which, without being used in manufacturing of the sheet, is recovered, wherein the dust collecting device includes
a cylindrical filter,
a backwash auxiliary member that is disposed at an end portion of the filter and of which at least a part is disposed in a cylinder of the filter,
an air current generation unit that generates a backwash air current that passes through the backwash auxiliary member and flows into the cylinder of the filter, and
a holding member that holds the backwash auxiliary member, the holding member includes a holding unit that is disposed inside of the filter and has a first surface and a second surface, the second surface faces in an opposite direction of the first surface in a direction of the backwash air current and is positioned downstream relative to the first surface in the direction of the backwash air current,
the backwash auxiliary member includes a first backwash auxiliary member that is attached to the first surface of the holding unit, and a second backwash auxiliary member that is attached to the second surface of the holding unit and is disposed downstream relative to the first backwash auxiliary member in the direction of the backwash air current such that the holding unit is disposed between the first and second backwash auxiliary members in the direction of the backwash air current, and
each of the first and second backwash auxiliary members includes a rectification unit that extends spirally in the axial direction of the center axis of the filter.

* * * * *